Figure 3:
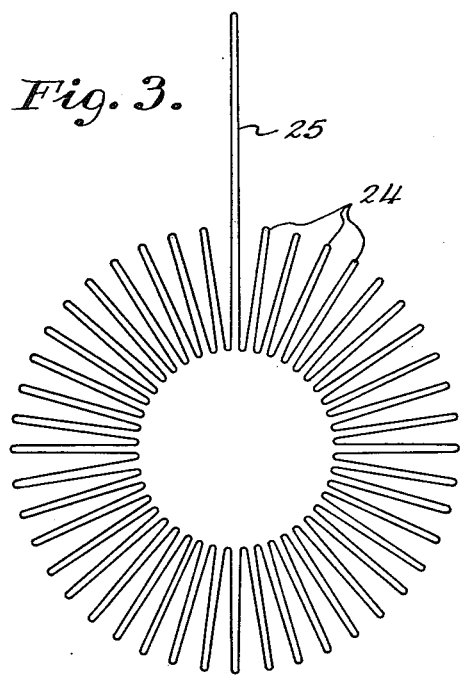

June 21, 1955 G. B. LITCHFORD 2,711,533
MULTI-LOBE OMNIDIRECTIONAL RADIO NAVIGATION SYSTEM
Filed April 22, 1952 3 Sheets-Sheet 1
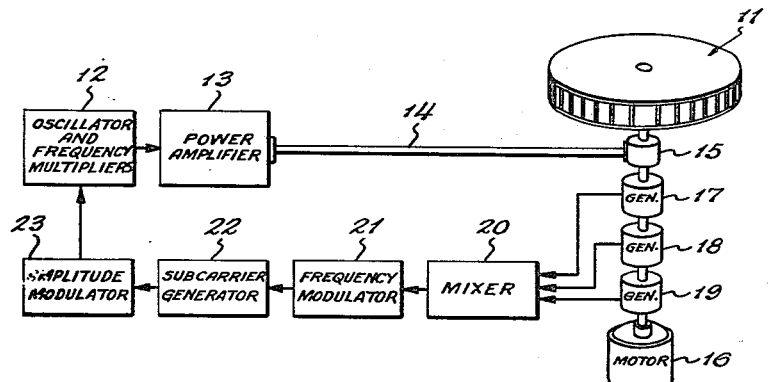
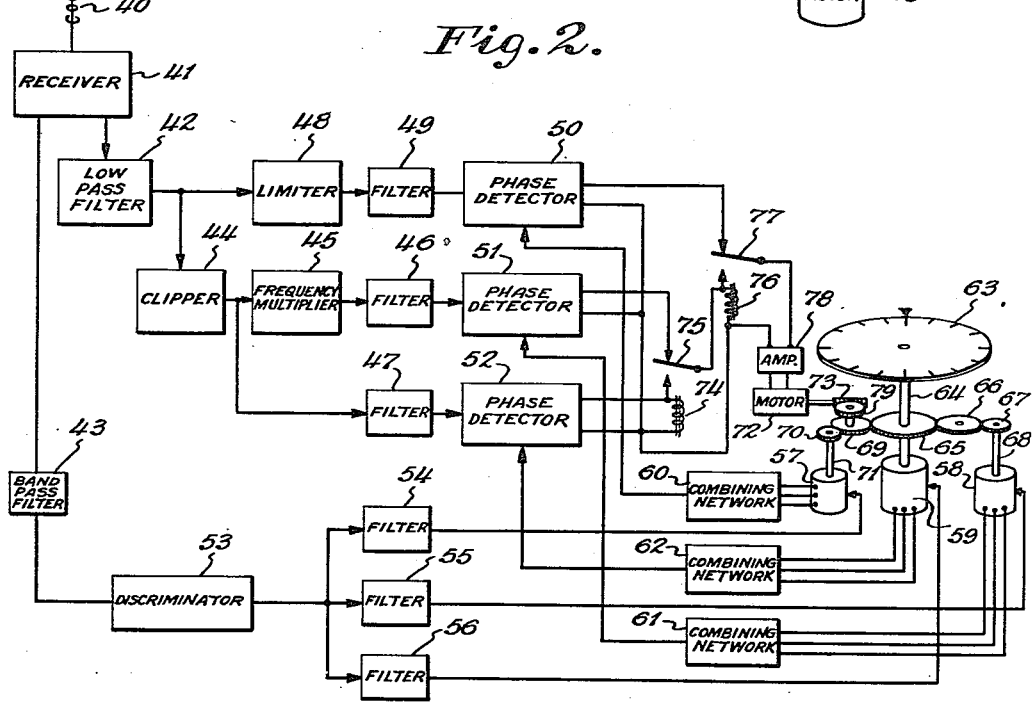
INVENTOR
GEORGE B. LITCHFORD
BY
ATTORNEY June 21, 1955 G. B. LITCHFORD 2,711,533
MULTI-LOBE OMNIDIRECTIONAL RADIO NAVIGATION SYSTEM
Filed April 22, 1952 3 Sheets-Sheet 2

INVENTOR
GEORGE B. LITCHFORD
BY
*Paul B. Hunter*
ATTORNEY

June 21, 1955  G. B. LITCHFORD  2,711,533
MULTI-LOBE OMNIDIRECTIONAL RADIO NAVIGATION SYSTEM
Filed April 22, 1952  3 Sheets-Sheet 3

INVENTOR
GEORGE B. LITCHFORD
BY
Paul B. Hunter,
ATTORNEY

United States Patent Office 2,711,533
Patented June 21, 1955

2,711,533

MULTI-LOBE OMNIDIRECTIONAL RADIO NAVIGATION SYSTEM

George B. Litchford, Cold Spring Harbor, N. Y., assignor to The Sperry Corporation, Great Neck, N. Y., a corporation of Delaware Application April 22, 1952, Serial No. 283,665

8 Claims. (Cl. 343—106)

This invention relates to improvements in omnidirectional radio navigation systems and in particular to omnidirectional systems of the type utilizing a rotational multi-lobe signal energy distribution pattern.

One such omnidirectional radio navigation system of this type is described in my Patent 2,564,703 entitled "Omni-Azimuth Guidance System" and assigned to the same assignee as the instant application. This system provides a transmitted rotational azimuth energy distribution pattern in the form of a scalloped or multi-lobe fringed limaçon. An antenna having a central radiator located between parallel circular plates produces the basic limaçon pattern upon which is superimposed an integral number of evenly spaced lobes, produced by phase front modifying elements equally spaced around the periphery of the parallel plates. This rotational azimuth distribution pattern induces in a suitable receiving equipment a pair of harmonically related signal voltages, one having a frequency equal to the pattern rotation frequency and the other having a frequency equal to the product of the number of the lobes and the pattern rotational frequency. A pair of reference phase voltages of the same frequencies as the harmonically related signals are transmitted on a sub-carrier and radiated along with the rotating azimuth distribution pattern. The receiving equipment, including fine and coarse phase measuring channels, measures the relative phase displacement between corresponding reference phase and signal voltages to provide an indication of the azimuth direction from the receiving location to the omnidirectional transmitting station.

One of the factors upon which the directional accuracy of this system is dependent is the number of lobes in the multi-lobe azimuth distribution pattern, which in turn is dependent upon the accuracy that is obtainable with the basic limaçon omnidirectional system. The required accuracy of the basic limaçon system can be stated as that necessary to enable a measurement of azimuth direction with a total azimuth error which is always less than the azimuth angle occupied by a single lobe in the multi-lobe azimuth distribution pattern.

A factor adversely influencing the accuracy of the basic limaçon system is the reflection of radiated energy from neighboring structures which combines with the direct radiated energy to cause a shift in the azimuth direction of the limaçon pattern. These factors determined the choice of the number of lobes in the above mentioned omnidirectional system.

To further increase the accuracy of azimuth direction measurements, a means has been devised in the instant invention to enable an increase in the number of lobes in a multi-lobe azimuth distribution pattern without sacrificing any of the advantages obtainable with the above fine and coarse omnidirectional radio navigation system.

In accordance with the present invention, there is introduced an omnidirectional radio navigation system employing a rotational multi-lobe signal energy distribution pattern wherein the intensity of a single one of the lobes is accentuated without appreciably altering the intensity of the remaining lobes.

An object of the present invention is to provide a directive rotational multi-lobe signal energy distribution pattern wherein the azimuth direction of an accentuated lobe is not altered by the presence of neighboring structures.

Another object is to provide a precision omnidirectional radio navigation system including fine and coarse phase measuring channels wherein the accuracy of the coarse channel measurements allows a high ratio of the fine to coarse signal frequencies employed in these channels.

Still another object is to provide a precision fine and coarse omnidirectional radio navigation system producing a rotational multi-lobe signal energy distribution pattern with an increased number of lobes.

Yet another object of the invention is to provide an improved omnidirectional radio navigation system capable of providing more precise measurements of the azimuth directions between a movable craft and a reference station.

Figure 5:
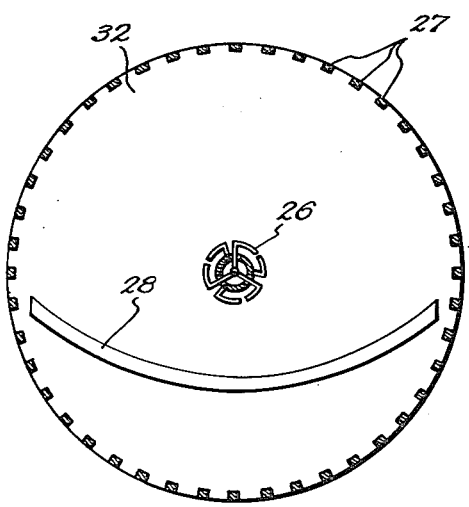
Figure 4:
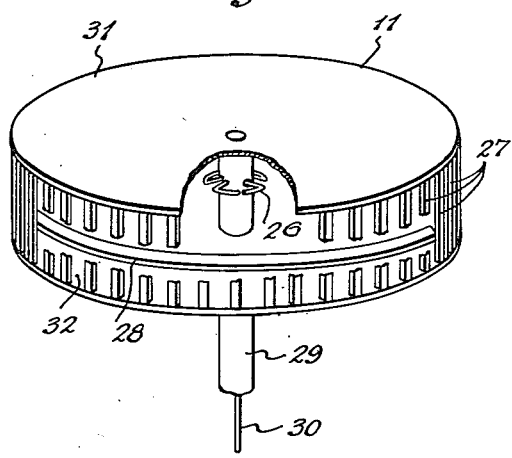
Figure 6:
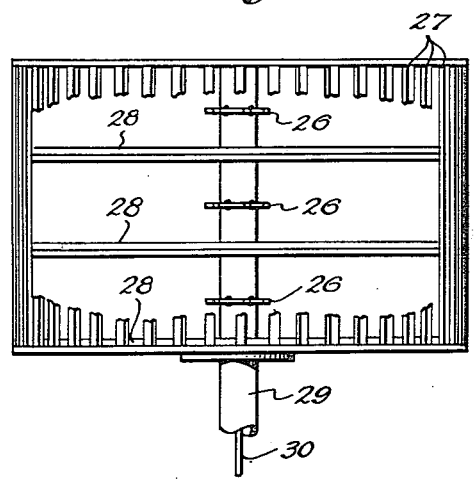
Figure 7:
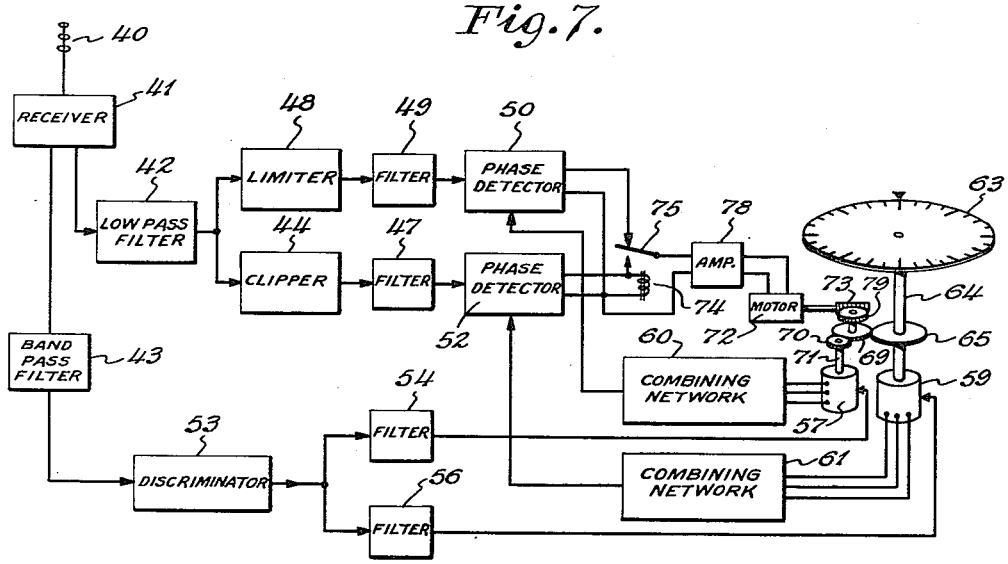
Figure 8:
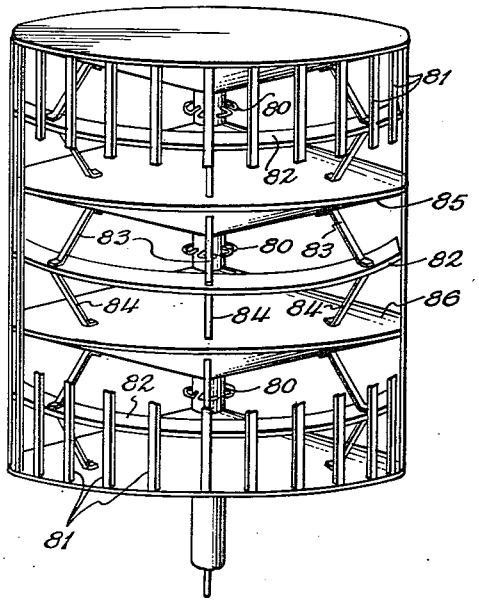
Figure 9:
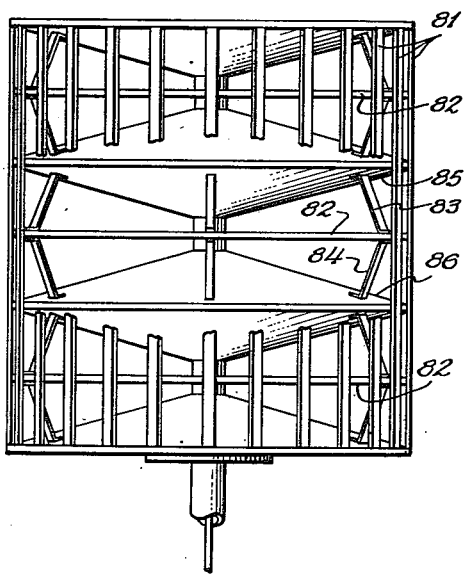

The above brief description and objects of the present invention will be more fully understood and further objects and advantages will become apparent from a careful study of the following detailed description in connection with the drawings, wherein, Fig. 1 is a block diagram of the omnidirectional transmitting station of the present invention, Fig. 2 is a block diagram of the receiving and direction indicating equipment of the present invention, Fig. 3 is a polar plot of the multi-lobe azimuth intensity distribution pattern radiated by the transmitting station of Fig. 1, Figs. 4 and 5 are perspective and sectional views, respectively, of the antenna for producing the pattern of Fig. 3, Fig. 6 is an elevation of an antenna having three sections like the antenna of Fig. 4 stacked one above the other, Fig. 7 is an alternative embodiment of the receiving and direction indicating equipment of the invention, and Figs. 8 and 9 are perspective and elevation views, respectively, of an alternative antenna having stacked biconical sections for producing a radiation pattern in accordance with the present invention.

In the several figures of the drawings, similar reference numerals refer to corresponding parts.

In the fixed omnidirectional transmitting station of Fig. 1, a rotatable directive antenna 11 is excited by an ultra-high-frequency transmitter comprising an oscillator and frequency multiplier unit 12 and a power amplifier 13. Ultra-high-frequency energy is coupled from the power amplifier over a length of wave guide 14 and through a conventional rotating joint 15 to the radiator of antenna 11. Motor 16 rotates the antenna 11 at a substantially constant angular velocity $\omega$, for example 900 R. P. M. Three reference phase generators 17, 18 and 19 are rotated in synchronism with antenna 11 by the motor 16. The reference phase output voltage components, which are harmonically related, are combined in mixer 20 and the combined voltages are applied to the frequency modulator 21 to frequency modulate a sub-carrier generator 22. The sub-carrier generator 22 in turn energizes an amplitude modulator 23 to amplitude modulate a frequency multiplier in the oscillator and frequency multiplier unit 12.

The rotating antenna 11 produces a multi-lobe azimuth intensity distribution pattern illustrated in Fig. 3. This pattern is characterized by a plurality of lobes 24 having equi-angular spacings and having a single lobe 25 whose intensity is accentuated relative to the intensity of the remaining lobes. For example, the intensity of the single lobe 25 may exceed the intensity of the remaining lobes 24 by 6 to 8 decibels. All the remaining lobes 24 have substantially equal intensities.

The distribution pattern of Fig. 3 may be produced by an antenna 11 including a substantially omnidirectional central radiator 26 surrounded by a plurality of equi-spaced phase front modifying devices 27 and a parabolic partial reflector 28 aligned between the radiator and the phase front modifying devices, as shown in Figs. 4 and 5. The central radiator 26 comprises three arcuate dipoles each having one of its arcuate arms connected to an outer sheath 29 of a rigid coaxial line, the other arm of each dipole being connected to the inner conductor 30 of the coaxial line. Each of these arcuate dipoles occupies a sector of about 120° around the vertical axis of the antenna, at a radius of approximately one-quarter wavelength. The phase front modifying devices 27 are illustrated as being partially cut away in Fig. 4 in order to show the construction of the antenna.

The radiator 26 is positioned at the center and midway between upper and lower conductive disc plates 31 and 32, which serve as a wave guide for conveying radiant energy radially outward from the central radiator 26 to the peripheral aperture of the antenna. Vertical phase front modifying devices 27 are arranged equally spaced around the peripheral aperture between the upper and lower conductive plates. The peripheral spacing between adjacent phase front modifying devices 27 is approximately equal to one wavelength of the energy guided between the conductive plates. These devices 27 alter the phase front of the substantially uniform circular distribution pattern of the central radiator to provide the lobes 24 as shown in Fig. 3. The phase front modifying devices 27 may be made of dielectric material or of material of appreciable resistivity, as desired, or of any material that produces the desired influence on the phase velocity of the energy emerging between the peripheries of plates 31 and 32.

The parabolic partial reflector 28 is attached, as shown in Fig. 5, to the inside surface of lower plate 32 and aligned between the central radiator and the phase front modifying devices such that its focus substantially coincides with the central radiator. This reflector may be of the form of a laminated plastic member whose inside parabolic surface facing the central radiator is covered with a thin conductive strip conforming to the parabolic surface. The reflector has a chord length approximately equal to the diameter of the circular plates such that it partially intercepts energy radiated from the central radiator over an angular range of approximately 180 degrees. The physical alignment of the parabolic reflector is performed in two simple steps. First, the axis of the parabolic reflector is positioned so that reflected energy from its surface is radiated in the direction of one of the lobes. Next, the parabolic reflector is positioned along the axis of its radiation until the electrical phase of the reflected energy is additive to the direct energy produced by the lobe prior to insertion of the parabolic reflector. After alignment, the parabolic reflector is securely attached to lower plate 32.

The parabolic reflector 28 is only a partial reflector. It intercepts a small percentage of the omnidirectional energy radiated from the central radiator, the amount of energy intercepted being determined by the relationship between the surface area of the parabolic reflecting surface and the spacing between the upper and lower plates. A larger reflector surface area and a small spacing between plates results in a large interception. The required amount of energy intercepted by the parabolic partial reflector in a suitable antenna has been found to be no more than that which causes a reduction of approximately 20 percent or one decibel of the energy in a single lobe on the back side of the reflector. This amount of energy interception when reflected by reflector 28 is sufficient to produce a single accentuated lobe 25 in a 44 lobe antenna whose intensity is approximately 7 decibels above adjacent lobes.

An increase in the vertical directivity of the multi-lobe distribution pattern of the antenna in Fig. 4 may be accomplished by stacking several antennas one above the other as shown by Fig. 6. Three identical antennas have been stacked in this figure with a spacing between central radiators approximately equal to one wavelength to insure that the horizontal radiations from the separate antennas are in phase with each other. The partial parabolic reflectors must be properly aligned in azimuth with respect to each other in order that only a single accentuated lobe is produced. The phase front modifying devices 27 are illustrated as being partially cut away in Fig. 6 to better show the construction of the antenna.

The receiving antenna 40 of the receiver and direction indicating equipment of Fig. 2 collects energy radiated by the rotating antenna 11. This energy is amplified and detected in receiver 41 and the output voltages from the receiver are supplied to low-pass filter 42 and band-pass filter 43. The multi-lobe azimuth distribution pattern of Fig. 3 rotating, for example, at an angular velocity of 15 revolutions per second, induces in receiver 41 a pair of harmonically related amplitude-modulated signal voltages in addition to the harmonically related reference phase voltages carried by the frequency-modulated sub-carrier. The pair of demodulated signal voltages is separated from the sub-carrier by the low-pass filter 42. The output signal voltage from this filter is of a continuous sinusoidal waveform with a single accentuated half-cycle repeating periodically at the rotating frequency of the azimuth distribution pattern, i. e. 15 cycles per second. The frequency of the continuous sinusoidal signal voltage is equal to the product of the number of lobes in the azimuth distribution pattern and its rotational frequency, 15 cycles per second, and for the example of a 44 lobe pattern, equals 660 cycles per second.

The accentuated half-cycles of repetition frequency equal to 15 cycles per second are separated from the 660 cycle-per-second sinusoidal voltage by a clipper 44 to form a periodic series of pulses. These periodic pulses are applied to frequency multiplier unit 45 which produces an output voltage multiplied in frequency, for example, by a factor of nine. This frequency multiplier output voltage is applied to a high Q band-pass filter 46, tuned to a frequency of 135 cycles per second, which produces a pure 135 cycle-per-second sinusoidal output voltage. The periodic pulses from clipper 44 also are applied to a high Q band-pass filter 47 tuned to 15 cycles per second which produces a 15 cycle-per-second sinusoidal output voltage. The output signal voltage from low-pass filter 42 also is passed through limiter 48 to remove the accentuated half-cycle and then to the band-pass filter 49 tuned to 660 cycles per second to produce a sinusoidal output voltage. The three harmonically related sinusoidal signal voltages from the filters 49, 46 and 47 are applied to fine, medium, and coarse phase measuring detectors 50, 51 and 52 respectively.

The frequency-modulated sub-carrier voltage from receiver 41 is passed through the band-pass filter 43, tuned to the frequency of the sub-carrier generator 22 at the fixed transmitting station in Fig. 1, and then to discriminator 53. The discriminator demodulates the frequency-modulated sub-carrier voltage to remove the composite, harmonically related, reference phase voltages. Fine, medium, and coarse reference phase sinusoidal voltages are selected by the band-pass filters 54, 55 and 56, respectively. These are the voltages produced by the three reference phase generators 17, 18 and 19, respectively, at the transmitting station in Fig. 1. Their frequencies correspond exactly to the frequencies of the fine, medium, and coarse signal voltages from the filters 49, 46 and 47, i. e. 660, 135 and 15 cycles per second, respectively.

The relative phase displacement between each of corresponding signal and reference phase voltages is measured in a manner now to be described. Fine, medium, and coarse reference phase voltages from the filters 54, 55 and 56 are applied to the single phase windings of three conventional rotatable phase-shifting transformers 57, 58 and 59, respectively. The multiple output voltages from the poly-phase windings of these three phase-shifting transformers are applied to combining networks 60, 61 and 62, respectively. The phase-shifting transformers and combining networks operate as linear phase shifters in accordance with the teaching in application S. N. 729,852, filed February 20, 1947, by J. E. Browder et al., now Patent 2,627,598, and assigned to the same assignee of the present invention. Phase-shifted versions of the fine, medium, and coarse reference phase voltages are applied to the second inputs of the phase detectors 50, 51 and 52, respectively.

An accurately calibrated azimuth indicating dial 63 is attached to the shaft 64 of the rotatable phase-shifting transformer 59. Shaft 64 is mechanically coupled by spur gears 65, 66 and 67 to the shaft 68 of phase-shifting transformer 58. The ratios of gears 65, 66 and 67 are such that one revolution of shaft 64 would produce 9 revolutions of shaft 68. This ratio of shaft revolutions is the same as the ratio of the frequencies of the coarse and medium reference phase voltages in these phase-shifting transformers. Likewise, the shaft 64 is mechanically coupled through spur gears 65, 69 and 70 to the shaft 71 of phase-shifting transformer 57, the ratios of these gears being such that one revolution of shaft 64 would produce 44 revolutions of shaft 71. The calibrated dial 63 is positioned, along with the ganged phase-shifting transformer, by servo motor 72 whose rotor is mechanically coupled to worm wheel 79 by a worm gear 73. The angular position of dial 63 is determined by the relative phase displacement between each of corresponding signal and reference phase voltages, this relative phase displacement being determined by the azimuth direction from the location of the receiving and indicating equipment to the fixed omnidirectional transmitting station.

Phase detector 52 is responsive to the 15 cycle-per-second coarse signal and reference phase voltages to produce a D. C. output control voltage varying according to the relative phase difference between these two voltages. This D. C. output control voltage, of reversible polarity, energizes the winding of relay 74 when it exceeds a certain threshold value to deflect armature 75 against the lower relay contact terminal. The D. C. output control voltage is then applied through the armature 75 to the winding of a second relay 76. This second relay is thereby energized and when closed connects its armature 77 to its lower contact terminal thus completing the electrical circuit from the output of phase detector 52 to the amplifier 78. The amplified D. C. control voltage from the amplifier 78 energizes the servomotor 72 to position the calibrated dial 63 and the geared phase-shifting transformers 57, 58 and 59. The rotor of coarse phase-shifting transformer 59 is rotated to shift the phase of the coarse reference phase voltage until the phase of this shifted component is such that the D. C. output control voltage from phase detector 52 is less than the threshold value necessary to hold the relay 74 closed. The position that the calibrated dial 63 assumes under this condition is a rough indication of the azimuth direction from the location of the receiving equipment to the fixed transmitting station.

The accuracy of this direction indication is progressively increased by the medium and fine phase measuring circuits in the following maner. When the relay 74 opens and the armature 75 is deflected against its upper contact terminal, a second D. C. control voltage produced at the output of the phase detector 51 is coupled to the winding of relay 76, holding this relay closed and thus completing the electrical circuit from the output of phase detector 51 to the input of amplifier 78. This second D. C. control voltage from phase detector 51 varies according to the relative phase difference between the 135 cycle-per-second signal and reference phase voltages. It is amplified by the amplifier 78 and energizes the servomotor to position the rotor of the phase-shifting transformer 58 to shift the phase of the 135 cycle-per-second reference phase voltage until phase detector 51 produces minimum D. C. output voltage. The calibrated dial 63 is repositioned to indicate azimuth direction to a higher degree of accuracy.

Finally, the D. C. control voltage from phase detector 51 drops below the threshold value necessary to hold relay 76 closed and the third D. C. control voltage from phase detector 50 is applied through the upper contact terminal of this relay and through armature 77 to the amplifier 78. This third D. C. control voltage varies according to the relative phase difference between the 660 cycle-per-second fine signal and reference phase voltages. It is also amplified by the amplifier 78 and energizes the servomotor to position the rotor of the fine phase-shifting transformer 57 to shift the phase of the fine reference phase voltage until the phase detector 50 produces minimum output voltage. This positioning of the fine phase-shifting transformer 57 again repositions the calibrated dial 63 to indicate azimuth direction to a still higher degree of accuracy.

The high accuracy of the present system is obtained not only because of an increase in the number of lobes in the azimuth distribution pattern but also because of the increase in the diameter of the antenna producing these lobes. With a larger diameter antenna, each single lobe is produced from the summation of energy radiated from a number of elementary sources distributed over a substantial area. One result obtained is that each lobe is narrower because of the wider aperture of the antenna. The azimuth direction of each of the narrow lobes is substantially unaltered by small variations in the physical dimensions and spacings of the individual phase front modifying devices because the elementary sources of energy producing each single lobe are distributed over a wider aperture. Furthermore, the azimuth direction of each lobe produced from the wide aperture source is substantially unaffected by the presence of neighboring structures or obstacles which tend to alter the direction of the lobes by either reflection or diffraction. This latter improvement results because only a small percentage of the radiated energy forming each single lobe is intercepted by the structure or obstacle.

The azimuth direction of the single-accentuated lobe is substantially unaltered by the reflection of one of the small lobes from a neighboring structure. Since the intensity of the energy of each small lobe is small in comparison to the intensity of the accentuated lobe, reflection of energy from any one of the small lobes in the same direction as the accentuated lobe can only increase or decrease its intensity by a small amount. Moreover, since the angular width of this reflected energy is of the same order as the angular width of the accentuated lobe, such reflected energy combined with the accentuated lobe has little or no effect upon its azimuth direction should the direction of the reflected energy be slightly different from the direction of the accentuated lobe.

The reflection of energy from the accentuated lobe in the direction of one of the small lobes does not disturb the phase measuring circuits in the receiver. The limiter 48 removes any high peaks of the fine signal voltage just as it removes the accentuated half-cycle caused by the accentuated lobe. In addition, the D. C. output control voltage from the fine phase measuring detector is an average voltage representing a phase measurement over many of the cycles of the fine signal.

The 135 cycle-per-second medium phase measuring channel employed in the receiver and direction indicating equipment of Fig. 2 serves the pupose of improving the accuracy of the 15 cycle-per-second coarse channel phase measurements to the extent necessary to allow the fine phase measuring channel to assume complete control of the positioning of the calibrated dial 63. For example, in a 44-lobe omnidirectional system, the coarse and medium phase measuring channels must be sufficiently accurate to position the calibrated dial 63 to within the equivalent angular range occupied by one cycle of the fine signal frequency. With 44 lobes equally spaced around 360 degrees of azimuth angle, each single lobe occupies an angle of 8.18 degrees. Thus, one cycle of the fine signal frequency of 660 cycles per second represents an angle of 8.18 degrees. Therefore, the calibrated dial 63 must be positioned with an accuracy better than plus or minus 4.09 degrees by the coarse and medium phase measuring channel before control of the positioning of the calibrated dial 63 is relinquished to the fine phase measuring channel.

The factors which determined the accuracy of the relative phase difference measurements obtained with the servo follow-up type phase measuring circuits employed in the coarse, medium, and fine phase measuring channels are well understood in the art. Generally, such phase measuring circuits can measure relative phase differences to an accuracy of a few percent of one cycle of the signal voltages involved. This accuracy can be expressed as plus or minus a certain number of degrees of one cycle, one cycle being 360 degrees. If the coarse phase measuring channel can measure the relative phase difference between the 15 cycle-per-second signal and reference phase voltage with an accuracy of ±2 percent of one cycle, i. e. ±7.2 degrees, it is seen that this measurement is insufficiently accurate to relinquish control directly from the coarse channel to the fine channel.

By employing the intermediate phase measuring channel, the required improvement in the accuracy of the coarse channel phase measurements is obtained. In multiplying the frequency of the 15 cycle-per-second signal voltage to 135 cycles per second, to form an intermediate phase measuring channel, the instrumentation accuracy is improved. By this is meant that a more accurate phase measurement can be made from the available coarse 15 cycle-per-second signal voltage without having to resort to some method of producing a rotating azimuth distribution pattern having means for producing a fundamental intermediate signal voltage component.

The 135 cycle-per-second sinusoidal signal voltage from filter 46 is accurately fixed relative to the 15 cycle-per-second pulses from clipper 44 in that the same portion of each 9th cycle of the 135 cycle-per-second voltage is coincident with the pulse from the clipper. If the accuracy of the medium phase measuring channel is such that the relative phase difference between 135 cycle-per-second signal and phase reference voltage can be measured to an accuracy of ±2 percent of one cycle, this accuracy corresponds to ±7.2 degrees of the 135 cycle-per-second signal or ±0.8 degree of azimuth angle. The instrumental accuracy has been improved by a factor of 9 which is more than enough to allow the fine phase measuring channel to assume control of the position of the calibrated dial 63. Thus, when an intermediate phase measuring channel is employed, the coarse and medium phase measuring channel need not be designed with the close tolerances required to produce phase measurements of such high accuracies as ±2 percent of one cycle.

With the accuracy of ±2 percent of one cycle provided in the fine phase measuring channel, the phase measuring circuits of the receiver and direction indicating equipment of Fig. 1 are capable of indicating azimuth angle to an accuracy of ±0.164 degree.

The alternative receiver and direction indicating equipment of Fig. 7 including only fine and coarse phase measuring channels may be used in omnidirectional radio navigating systems in accordance with the present invention where the number of lobes employed in the azimuth distribution pattern and the accuracy of phase measurements in the coarse phase measuring channel are such that an intermediate or medium phase measuring channel is not required. The apparatus of this figure differs from the apparatus of Fig. 1 in that no medium phase measuring channel is employed. With an accurate coarse phase measuring channel capable of positioning the calibrated dial 63 with an angular accuracy less than the angle occupied by a single lobe in a multi-lobe azimuth distribution pattern, the control of the position of the calibrated dial 63 may be transferred directly to the fine phase measuring channel.

The receiver and direction indicating equipment of Fig. 7 operates in a manner analogous to that of the receiver and direction indicating equipment of Fig. 2. The phase detector 52 is responsive to the coarse signal and reference phase voltages to produce a D. C. output control voltage varying according to the relative phase difference between these two voltages. This D. C. control voltage energizes relay 74 when it exceeds a certain threshold value to couple the D. C. control voltage to amplifier 78. The amplified D. C. control voltage energizes the servomotor 72 to position the calibrated dial 63 and the geared phase-shifting transformers 57 and 59. The rotor of coarse phase-shifting transformer 59 is rotated to shift the phase of the coarse reference phase voltage until the phase of this shifted component is such that the D. C. output control voltage from the phase detector 52 is less than the threshold value necessary to hold relay 74 closed. When the relay 74 opens and the armature 75 is deflected against its upper contact terminal, control of the position of the calibrated dial 63 is relinquished to the fine phase measuring channel. Thereafter, the D. C. output control voltage from phase detector 50 in the fine channel is applied through the upper contact terminal of relay 74 and through armature 77 to the amplifier 78. The amplifier control voltage energizes the servomotor 72 to position the rotor of the fine phase-shifting transformer 57 to shift the phase of the fine reference phase voltage until the phase detector 50 produces minimum D. C. output voltage. The positioning of the fine phase-shifting transformer 57 also repositions the calibrated dial 63 to indicate azimuth direction to the necessary high degree of accuracy.

The receiver and direction indicating equipment of Fig. 7 may be used with the omnidirectional transmitting station of Fig. 1. Since the intermediate or medium phase measuring channel is no longer required, the medium phase reference generator 18 may be eliminated.

An alternative antenna in accordance with the present invention having 30 lobes and a further increased vertical directivity is shown in Figs. 8 and 9. The antenna includes three identical biconical sections stacked one above the other, and a substantially omnidirectional radiator 80 centrally located at the throat of each biconical section. Thirty equispaced phase front modifying devices 81 are distributed around the peripheral aperture of the biconical sections. Each of the parabolic partial reflectors 82 is supported as illustrated, in the cut away portion, by metallic members 83 and 84 between the walls 85 and 86 of the biconical sections. These parabolic reflectors are aligned in the same manner as explained in connection with the antenna 11 of Figs. 4 and 5. The central radiators 80 are excited in phase to insure that the horizontal radiations from each biconical section are additive.

To increase the rigidity of the antenna of Figs. 8 and 9, narrow metallic strips, not shown, may be attached diagonally between the upper biconical section and lower biconical section around the periphery of the antenna. Such diagonal strips do not distort the azimuth distribution pattern. Furthermore, it has been found that thin metallic members ⅛ inch wide and 7/32 inch thick may be securely attached to the outside surface of each of the phase front modifying elements 81 to increase rigidity without adversely altering the azimuth distribution pattern of the antenna.

The increase in vertical directivity is obtained because of an increase in the height of the antenna. With the greater height, the pattern in the vertical plane is produced from the summation of energy radiated from a number of elementary sources distributed over a substantial area. The increased vertical directivity minimizes reflection from the ground and restricts the radiated power to the volumetric region to be served by the omnidirectional transmitting station.

Representative dimensions for the antenna 11 of Fig. 4 for operation at a frequency of approximately 5000 megacycles are as follows:

Diameter of upper and lower plates 31, 32
inches__ 44
Distance between plates 31, 32_____do____ 1⅞
Outer diameter of rigid coaxial line 29_____do____ ⅝
Radius of dipole arms_____do____ ¾
Focal length of reflector 28_____do____ 11
Vertical extent of reflector 28_____do____ ¼
Chord length of reflector 28_____do____ 43
Number of phase front modifying elements 27_____ 44
Peripheral spacing between modifying elements
27 _____inches__ 3⅛
Width of modifying elements 27_____do____ ½
Thickness of modifying elements 27_____do____ 3/16

The phase front modifying elements 27 are made from the dielectric material polystyrene.

For the antenna of Fig. 6, the vertical spacing between central radiators 26 equals 2¼ inches. The rest of the dimensions are the same as for antenna 11 in Fig. 4.

For the antenna of Figs. 8 and 9, the dimensions are as follows:

Diameter of the antenna_____inches__ 33
Peripheral height of each biconical section
do____ 10⅛
Vertical spacing between central radiators
80 _____do____ 10½
Vertical angle at the throat of each biconical
section _____degrees__ 28
Outside diameter of rigid coaxial line____inches__ ⅝
Radius of dipole arms_____do____ ¾
Focal length of reflector 82_____do____ 9
Thickness of reflector 82_____do____ ¼
Chord length of reflector 82_____do____ 32
Number of phase front modifying elements 81____ 30
Peripheral spacing between modifying elements
81 _____inches__ 3½
Width of modifying elements 81_____do____ ½
Thickness of modifying elements 81_____do____ 3/16

While the antennas in the present invention have been illustrated as having 44 and 30 lobes respectively, the invention is not limited to these particular choices in the number of lobes. Suitable antennas may be constructed having a larger or smaller number of lobes, and an odd number of lobes may be employed if desired. In my aforesaid Patent 2,564,703, a preference has been indicated for an odd number of lobes for reasons which are also applicable to the present invention.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

I claim:

1. An omnidirectional radio navigation system including a reference transmitting station and at least one mobile receiving station, said reference station comprising a transmitter, an antenna connected to said transmitter comprising a central radiator surrounded by a plurality of equi-spaced phase front modifying elements for producing a multi-lobe azimuth intensity distribution pattern, said antenna including a parabolic partial reflctor aligned between said central radiator and said phase front modifying elements with its focus substantially coinciding with said central radiator for accentuating the intensity of a single lobe of said multi-lobe azimuth distribution pattern without appreciably altering the intensity of the remaining lobes, means for rotating said antenna at a substantially constant angular velocity for producing a rotating field pattern, means coupled to said rotating means for producing reference phase signals corresponding to the signals produced by said rotating field pattern, means modulating said transmitter with said reference phase signals; means at said mobile station for reproducing said reference phase signals, means responsive to said rotating field pattern to produce signals of the same frequency as said reproduced reference phase signals but displaced in phase with respect thereto in accordance with the direction of said mobile station from said reference transmitting station, and means responsive to said last mentioned signals and to said reproduced reference phase signals to indicate said direction.

2. In an omnidirectional radio navigation system, a directive antenna including a central radiator surrounded by a plurality of equi-spaced phase front modifying elements for producing a multi-lobe azimuth intensity distribution pattern, said directive antenna including a parabolic partial reflector aligned between said central radiator and said phase front modifying elements with its focus substantially coinciding with said central radiator for accentuating the intensity of a single lobe of said multi-lobe azimuth distribution pattern without appreciably altering the intensity of the remaining lobes, means for rotating said antenna at a substantially constant angular velocity, a transmitter coupled to said directive antenna, reference phase signal generating means coupled to said rotating means, and means coupled to said reference phase generating means for omnidirectionally transmitting the reference phase signals.

3. In a multi-lobe omnidirectional radio navigation system, a directive antenna comprising a central radiator having a substantially circular azimuth intensity distribution pattern, a pair of conductive plates disposed respectively above and below said radiator for radially guiding the energy therebetween, a plurality of equi-spaced phase front modifying devices between said conductive plates and surrounding said radiator for producing a multi-lobe azimuth distribution pattern, and a parabolic partial reflector between said plates and aligned such that its focus substantially coincides with said central radiator, said parabolic partial reflector accentuating the intensity of a single lobe of said multi-lobe azimuth intensity pattern without appreciably altering the intensity of the remaining lobes.

4. In an omnidirectional radio navigation system, a reference station including a transmitter, an antenna coupled to said transmitter and comprising a central radiator having a substantially circular azimuth intensity distribution pattern, a pair of conductive plates disposed respectively above and below said radiator for radially guiding the energy therebetween, a plurality of equi-spaced phase front modifying devices between said conductive plates and surrounding said radiator for producing a multi-lobe azimuth distribution pattern, radiant energy director means associated with said antenna for modifying the intensity of a single lobe of said multi-lobe azimuth distribution pattern without appreciably altering the intensity of the remaining lobes, means for rotating said antenna at a substantially constant angular velocity, to thereby produce a rotating field pattern in space, reference phase voltage generating means coupled to said rotating means for producing a pair of harmonically related reference phase voltages, the first reference phase voltage having a frequency equal to the rotational frequency of said rotating field pattern, the second reference phase voltage having a frequency equal to the product of the frequency of said first reference phase voltage and the number of lobes in said multi-lobe azimuth distribution pattern, and means omnidirectionally transmitting each of said reference phase voltages.

5. In a multi-lobe omnidirectional radio navigation system wherein radio energy is transmitted from a central station in a multi-fingered azimuthal directional radiation pattern with one accentuated finger, said radiation pattern being revolved about the vertical axis at a regular rate and being accompanied by the transmission of reference phase modulation voltages including a low frequency component at the frequency of revolution of said radiation pattern and a high frequency component at a frequency equal to the product of the number of fingers in said radiation pattern and the frequency of revolution of said pattern; a radio receiving system comprising: a direction indicator, servo means for actuating said indicator, means responsive to said transmitted radio energy for producing fine and coarse direction indicating signals from said multi-fingered azimuthal directional radiation pattern wherein said fine and coarse direction indicating signals are characterized as a continuous alternating voltage waveform with one accentuated half-cycle repeating at the rotational frequency of said radiation pattern, said responsive means also producing said low and high frequency reference phase voltage components, separating means coupled to said responsive means for separating into different channels said fine and coarse direction indicating signals from said low and high frequency reference phase voltage components, first phase comparator means coupled to said separating means for controlling said servo means according to the relative phase difference between said coarse direction indicating signal and said low frequency reference phase voltage component, and second phase comparator means coupled to said separating means for further controlling said servo means according to the relative phase difference between said fine direction indicating signal and said high frequency reference phase voltage component whereby the direction from the location of said receiver to said omnidirectional radio transmitting station is indicated on said direction indicator.

6. In a multi-lobe omnidirectional radio navigation system, a directive antenna comprising a central radiator having a substantially circular azimuth intensity distribution pattern, a pair of conductive plates disposed respectively above and below said radiator for radially guiding the energy therebetween, a plurality of equi-spaced phase front modifying devices between said conductive plates and surrounding said radiator for producing a multi-lobe azimuth distribution pattern, radiant energy directing means disposed between said plates and having a focus substantially coincident with said central radiator, said radiant energy directing means accentuating the intensity of a single lobe of said multi-lobe azimuth intensity pattern without appreciably altering the intensity of the remaining lobes.

7. In a multi-lobe omnidirectional radio navigation system, a directive antenna comprising a central radiator having a substantially circular azimuth intensity distribution pattern, a pair of conductive plates disposed respectively above and below said radiator for radially guiding the energy therebetween, means disposed around the periphery of said conductive plates for providing regular variations therearound of the phase front of the energy emergent therefrom to produce a multi-lobe azimuth distribution pattern, and a parabolic partial reflector between said plates having its focus substantially coincident with said central radiator, said parabolic partial reflector accentuating the intensity of a single lobe of said multi-lobe azimuth intensity pattern without appreciably altering the intensity of the remaining lobes.

8. In a multi-lobe omnidirectional radio navigation system wherein radio energy is transmitted from a central station in a multi-fingered azimuthal directional radiation pattern with one accentuated finger, said radiation pattern being revolved about the vertical axis at a regular rate and being accompanied by the transmission of reference phase modulation voltages including a low frequency component at the frequency of revolution of said radiation pattern and a high frequency component at a frequency equal to the product of the number of fingers in said radiation pattern and the frequency of revolution of said pattern; a radio receiving system comprising: a direction indicator, servo means for actuating said indicator, means responsive to said transmitted radio energy for producing fine and coarse direction indicating signals from said multi-fingered azimuthal directional radiation pattern wherein said fine and coarse direction indicating signals are characterized as a continuous alternating voltage waveform with one accentuated half-cycle repeating at the rotational frequency of said radiation pattern, said responsive means also producing said low and high frequency reference phase voltage components, first separating means coupled to said responsive means for separating into different channels said fine and coarse direction indicating signals from said low and high frequency reference phase voltage components, second separating means coupled to the output of said first separating means for separating said fine direction indicating signal from said coarse direction indicating signal, third separating means coupled to the output of said first separating means for separating said low frequency reference phase voltage component from said high frequency reference phase voltage component, first phase comparator means coupled to the outputs of said second and third separating means for controlling said servo means according to the relative phase difference between said separated coarse direction indicating signal and said separated low frequency reference phase voltage component, and second phase comparator means coupled to the outputs of said second and third separating means for further controlling said servo means according to the relative phase difference between said separated fine direction indicating signal and said separated high frequency reference phase voltage component whereby the direction from the location of said receiver to said omnidirectional radio transmitting station is indicated on said direction indicator.

No references cited.